(12) United States Patent
Goto (10) Patent No.: US 10,046,555 B2
(45) Date of Patent: Aug. 14, 2018

(54) RECORDING METHOD AND RECORDING APPARATUS

(71) Applicant: CANON KABUSHIKI KAISHA, Tokyo (JP)

(72) Inventor: Ryohei Goto, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/918,933

(22) Filed: Oct. 21, 2015

(65) Prior Publication Data

US 2016/0114574 A1 Apr. 28, 2016

(30) Foreign Application Priority Data

Oct. 23, 2014 (JP) ................................ 2014-216511

(51) Int. Cl.
| | | |
|---|---|---|
| *B41J 2/005* | (2006.01) | |
| *B41J 2/21* | (2006.01) | |
| *C09D 11/38* | (2014.01) | |
| *B41M 5/00* | (2006.01) | |
| *B41M 5/025* | (2006.01) | |
| *C09D 11/54* | (2014.01) | |

(52) U.S. Cl.
CPC ........... *B41J 2/0057* (2013.01); *B41J 2/2107* (2013.01); *B41M 5/0017* (2013.01); *B41M 5/0256* (2013.01); *C09D 11/38* (2013.01); *C09D 11/54* (2013.01); *B41M 2205/10* (2013.01)

(58) Field of Classification Search
CPC ................................ B41J 2/0057; B41J 2/2114
See application file for complete search history.

(56) References Cited

U.S. PATENT DOCUMENTS

| 4,538,156 | A | | 8/1985 | Durkee et al. | |
|---|---|---|---|---|---|
| 5,099,256 | A | | 3/1992 | Anderson | |
| 5,274,025 | A | * | 12/1993 | Stockl | C08L 67/00 524/513 |
| 8,500,269 | B2 | * | 8/2013 | Morita | B41J 2/0057 347/103 |
| 2005/0110856 | A1 | | 5/2005 | Mouri | |
| 2005/0270351 | A1 | * | 12/2005 | Mouri | B41J 2/0057 347/103 |

(Continued)

FOREIGN PATENT DOCUMENTS

| CN | 1990241 A | 7/2007 |
|---|---|---|
| CN | 101675128 A | 3/2010 |

(Continued)

*Primary Examiner* — Stephen Meier
*Assistant Examiner* — John P Zimmermann
(74) *Attorney, Agent, or Firm* — Canon U.S.A., Inc. IP Division (57) ABSTRACT

A recording method according to an aspect of the invention includes: applying a reactant to an intermediate transfer body, the reactant configured to thicken upon contact with ink; forming an intermediate image by applying ink to the intermediate transfer body carrying the reactant; applying an auxiliary liquid to the intermediate image to form an intermediate image layer, the auxiliary liquid containing a water-soluble polymer; and transferring the intermediate image layer to a recording medium; in this order. At least one selected from the group consisting of the reactant, the ink, and the auxiliary liquid contains a certain compound.

7 Claims, 1 Drawing Sheet

(56) References Cited

U.S. PATENT DOCUMENTS

| | | | |
|---|---|---|---|
| 2007/0165086 A1* | 7/2007 | Sekiguchi | C09D 11/30 347/100 |
| 2007/0229639 A1 | 10/2007 | Yahiro | |
| 2007/0263032 A1* | 11/2007 | Sekiguchi | C09D 11/38 347/44 |
| 2008/0081912 A1* | 4/2008 | Harada | C07D 209/14 546/276.7 |
| 2009/0258145 A1* | 10/2009 | Mukae | C09D 11/322 427/256 |
| 2011/0141188 A1 | 6/2011 | Morita | |
| 2012/0251832 A1* | 10/2012 | Huang | C08G 65/336 428/447 |
| 2013/0224651 A1 | 8/2013 | Kanasugi | |
| 2013/0251895 A1 | 9/2013 | Jinnou | |
| 2014/0218424 A1 | 8/2014 | Koitabashi | |
| 2014/0247302 A1 | 9/2014 | Ohnishi | |

FOREIGN PATENT DOCUMENTS

| | | |
|---|---|---|
| JP | S62-92849 A | 4/1987 |
| JP | 2005170036 A | 6/2005 |
| JP | 4834300 B2 | 12/2011 |

\* cited by examiner

RECORDING METHOD AND RECORDING APPARATUS

BACKGROUND OF THE INVENTION

Field of the Invention

The present invention relates to a recording method and a recording apparatus.

Description of the Related Art

Inkjet recording apparatuses are in widespread use as, for example, computer-related output equipment because of their low running costs, potential for downsizing, and ease of adaptation to the recording of color images using inks in different colors. In recent years, recording apparatuses that allow rapid and high-quality output of images regardless of the kind of recording paper are in demand. Rapid and high-quality output of images requires reducing the occurrence of defects in images, such as feathering, a defect characterized by ink spreading along the fibers of recording paper.

A proposed solution to this problem is a transfer recording apparatus that incorporates an intermediate transfer body (U.S. Pat. No. 4,538,156, U.S. Pat. No. 5,099,256, and Japanese Patent Laid-Open No. 62-92849). The operation of a transfer recording apparatus starts with forming a primary image on an intermediate transfer body using an inkjet recording apparatus. The primary image is then dried on the transfer body and transferred to recording paper to form a secondary image. Methods based on the use of this type of recording apparatus, in which a primary image is dried on a transfer body, are unlikely to cause feathering defects that would prevent rapid and high-quality output of images. These methods, however, have some problems that interfere with successful formation of images, such as incomplete image transfer and divided transfer of images to the intermediate transfer body and the recording paper caused by internal separation of the images. An example of a disclosed solution to this problem is a method that includes applying, to an ink image formed beforehand, a second material that contains a water-soluble polymer (Japanese Patent No. 4834300).

SUMMARY OF THE INVENTION

An aspect of the invention provides a recording method. The recording method includes: applying a reactant to an intermediate transfer body, the reactant configured to thicken upon contact with ink; forming an intermediate image by applying ink to the intermediate transfer body carrying the reactant; applying an auxiliary liquid to the intermediate image to form an intermediate image layer, the auxiliary liquid containing a water-soluble polymer; and transferring the intermediate image layer to a recording medium; in this order.

At least one component, selected from the group consisting of the reactant, the ink, and the auxiliary liquid, contains a compound represented by formula (1).

(1)

(In formula (1), "w" and "x" each independently represent a divalent organic group. "a" and "b" each independently represent a hydrogen atom or a monovalent organic group. "n" and "l" are each independently 1 or more, and "n"+"l" is 2 or more and 300 or less. "m" is 1 or more and 70 or less. "p" and "q" are each independently 0 or 1.)

Another aspect of the invention provides a recording apparatus. The recording apparatus has: a reactant applicator configured to apply a reactant to an intermediate transfer body, the reactant configured to thicken upon contact with ink; an intermediate image formation unit configured to form an intermediate image by applying ink to the intermediate transfer body carrying the reactant; an auxiliary liquid applicator configured to apply an auxiliary liquid to the intermediate image to form an intermediate image layer, the auxiliary liquid containing a water-soluble polymer; and a transfer unit configured to transfer the intermediate image layer to a recording medium.

At least one component, selected from the group consisting of the reactant, the ink, and the auxiliary liquid, contains a compound represented by formula (1).

According to certain aspects of the invention, there are provided a recording method and a recording apparatus both of which allow the user to perform recording with high transfer efficiency.

Further features of the present invention will become apparent from the following description of exemplary embodiments with reference to the attached drawing.

DESCRIPTION OF THE EMBODIMENTS

Figure 1:
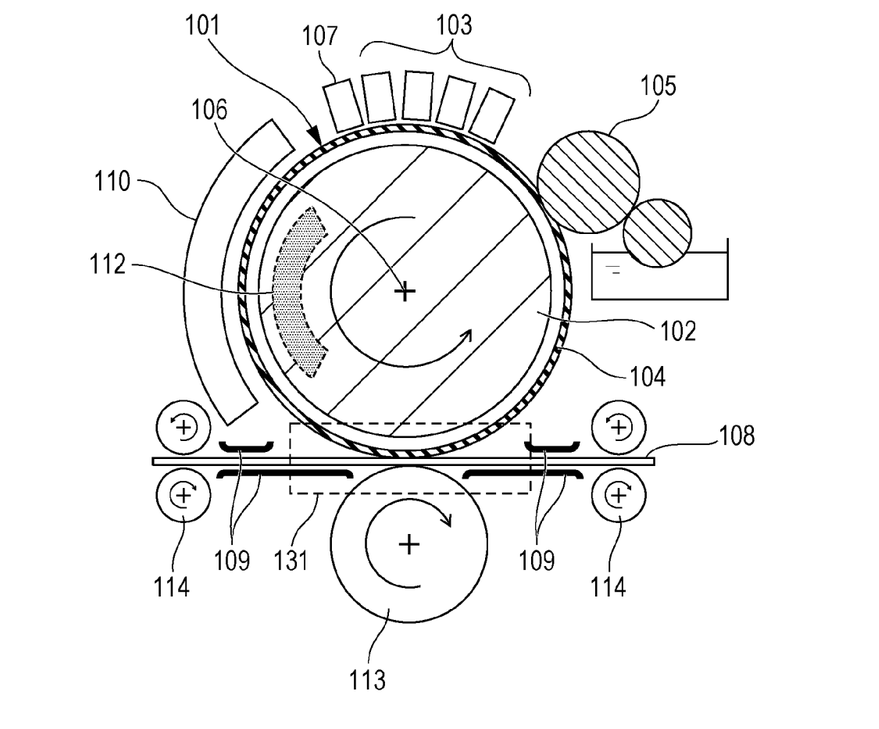
The FIGURE is a cross-sectional diagram that illustrates an example of a recording apparatus according to an embodiment of the invention.

The method disclosed in Japanese Patent No. 4834300 uses a second material that contains a water-soluble polymer to improve the transfer of images to recording paper and the abrasion resistance of transferred images. The inventor's research, however, revealed that the method disclosed in Japanese Patent No. 4834300 needs to be further improved as it does not perform well in transferring images to recording paper, i.e., is of low transfer efficiency, particularly when the recording paper is wood-free paper (uncoated printing paper) or any other kind of paper having low smoothness on its recording surface.

Certain embodiments of the invention provide a recording method and a recording apparatus both of which allow the user to perform recording with high transfer efficiency.

Recording Method

A recording method according to an embodiment of the invention includes, in the indicated order, applying a reactant to an intermediate transfer body, the reactant configured to thicken upon contact with ink, forming an intermediate image by applying ink to the intermediate transfer body carrying the reactant, applying an auxiliary liquid to the intermediate image to form an intermediate image layer, the auxiliary liquid containing a water-soluble polymer, and transferring the intermediate image layer to a recording medium. The auxiliary liquid contains a water-soluble polymer. At least one component, selected from the group consisting of the reactant, the ink, and the auxiliary liquid, contains a compound represented by formula (1) (hereinafter referred to as "compound (1)").

(1)

In formula (1), "w" and "x" each independently represent a divalent organic group. "a" and "b" each independently represent a hydrogen atom or a monovalent organic group. "n" and "l" are each independently 1 or more, and "n"+"l" is 2 or more and 300 or less. "m" is 1 or more and 70 or less. "p" and "q" are each independently 0 or 1.

In a method according to an embodiment of the invention, at least one of the reactant, the ink, and the auxiliary liquid contains compound (1), and the auxiliary liquid contains a water-soluble polymer. Compound (1) is a surfactant and forms hydrogen bonds with the water-soluble polymer in the auxiliary liquid. The resulting intermolecular interactions between compound (1) and the water-soluble polymer lead to the formation of an aggregate in the intermediate image layer through the mediation of the water-soluble polymer, increasing the viscosity of the intermediate image layer. As a result, the adhesion between the intermediate image layer and the recording medium during the transfer of the intermediate image layer is sufficiently much stronger than that between the intermediate image layer and the intermediate transfer body, allowing efficient transfer of the intermediate image to the recording medium even when the recording medium is low-smoothness recording paper. The following describes the details of a method according to an embodiment of the invention.

Application of a Reactant

A reactant is applied to an intermediate transfer body. The reactant has been configured to thicken upon contact with ink.

Reactant

A reactant according to an embodiment of the invention is a liquid that thickens upon contact with ink. This means that when a reactant, according to an embodiment of the invention, comes into contact with ink, the reactant is more viscous where it is in contact with the ink than it alone is. The potential of a reactant to thicken upon contact with ink can be estimated through viscosity measurement using a rheometer (trade name, AR-G2; TA Instruments). The reactant may contain, for example, a component that thickens ink (hereinafter also referred to as an ink-thickening component), a surfactant, and a solvent.

Ink-Thickening Component

A reactant according to an embodiment of the invention may contain an ink-thickening component. The thickening of ink herein includes not only an increase in the overall viscosity of the ink associated with chemical reaction or physical adsorption that occurs when any component of the ink, such as a coloring material or a polymer, comes into contact with an ink-thickening component, but also an increase in local viscosity that occurs when part of a coloring material or any other component of the ink aggregates.

The ink-thickening component prevents bleeding and beading during the formation of images by reducing the fluidity of at least part of the ink on the intermediate transfer body. Examples of ink-thickening components that can be used include polyvalent metal ions, organic acids, cationic polymers, and porous particles. It is preferred that the ink-thickening component be a polyvalent metal ion or an organic acid.

Examples of polyvalent metal ions include divalent metal ions such as $Ca^{2+}$, $cu^{2+}$, $Ni^{2+}$, $mg^{2+}$, $Sr^{2+}$, $Ba^{2+}$, and $Zn^{2+}$ and trivalent metal ions such as $Fe^{3+}$, $Cr^{3+}$, $Y^{3+}$, and $Al^{3+}$. Examples of organic acids include oxalic acid, polyacrylic acid, formic acid, acetic acid, propionic acid, glycolic acid, malonic acid, malic acid, maleic acid, ascorbic acid, levulinic acid, succinic acid, glutaric acid, glutamic acid, fumaric acid, citric acid, tartaric acid, lactic acid, pyrrolidonecarboxylic acid, pyronecarboxylic acid, pyrrole carboxylic acid, furancarboxylic acid, pyridinecarboxylic acid, coumarinic acid, thiophenecarboxylic acid, nicotinic acid, oxysuccinic acid, and dioxysuccinic acid. These ink-thickening components may be used alone or in a combination of two or more. The quantity of the ink-thickening component in the reactant can be 5% by mass or more, preferably 10% by mass or more and 50% by mass or less, of the total mass of the reactant.

Surfactant

At least one selected from the group consisting of the reactant according to an embodiment of the invention and the ink and auxiliary liquid described hereinafter contains a compound represented by formula (1) (compound (1)) as a surfactant. Compound (1) may be contained in two or more components selected from the group consisting of the reactant, the ink, and the auxiliary liquid. Compound (1) can also be contained in all of the reactant, the ink, and the auxiliary liquid. "w" and "x" in formula (1) each independently represent a divalent organic group. An example of a divalent organic group is methylene. The groups w and x may be the same or different. "a" and "b" in formula (1) each independently represent a hydrogen atom or a monovalent organic group. An example of a monovalent organic group is methyl. "a" and "b" may be the same group or different groups. "n"+"l" is 2 or more and 300 or less. "n"+"l" can be 2 or more and 150 or less, preferably 2 or more and 80 or less. "n" and "l" are each independently 1 or more. "n" and "l" can be each independently 1 or more and 75 or less, preferably 1 or more and 40 or less. "m" is 1 or more and 70 or less. "m" can be 1 or more and 60 or less, preferably 1 or more and 20 or less. "p" and "q" are each independently 0 or 1. "w" and "x" therefore each independently represent an optional group. The compound may be a mixture of multiple compounds with different numbers of oxyethylene and oxypropylene units because the number of units added may vary while the compound is in production process. "l," "m," and "n" in product labeling therefore each independently represent a mean and are not necessarily integers.

Specific examples of compounds (1) that are commercially available include Adeka Pluronic L31 (a trade name of ADEKA, hereinafter also referred to as L31) and Adeka Pluronic L34 (a trade name of ADEKA, hereinafter also referred to as L34). The structure of Adeka Pluronic L31 (a trade name of ADEKA) is given by formula (1) where a=H, b=H, n=1.5, l=1.5, m=16, p=0, and q=0. The structure of Adeka Pluronic L34 (a trade name of ADEKA) is given by formula (1) where a=H, b=H, n=7, l=7, m=16, p=0, and q=0. By way of example, the molecule of Adeka Pluronic L31 (a trade name of ADEKA) contains two sites available for hydrogen bonding. These hydrogen bonding sites allow the compound to form an aggregate through the mediation of the water-soluble polymer. This aggregate thickens the intermediate image layer. These may be used alone or in a combination of two or more. When the reactant contains compound (1), the quantity of compound (1) in the reactant can be 0.01% by mass or more and 10% by mass or less, preferably 1% by mass or more and 5% by mass or less, of the total mass of the reactant.

The reactant may further contain a surfactant different from compound (1) (hereinafter referred to as "a non-compound (1) surfactant") as an agent for adjusting the surface tension and viscosity of the reactant. Examples of commercially available non-compound (1) surfactants include Acetylenol EH (a trade name of Kawaken Fine Chemicals). These may be used alone or in a combination of two or more.

Solvent

The reactant may contain a solvent that is an appropriate amount of water or organic solvent. The water can be ion-exchanged or any other deionized water. The organic solvent can be of any kind.

Besides the components described above, the reactant may contain polymers. The presence of an appropriate polymer ensures good adhesion to the recording medium during transfer and enhances the mechanical strength of the finished image. The polymer can be of any kind compatible with the ink-thickening component.

Application of the Reactant

The reactant can be applied to the surface of the intermediate transfer body using, for example, die coating, blade coating, any method in which gravure rollers or offset rollers are used, or spray coating. It is also possible to apply the reactant using an inkjet device. A combination of multiple methods can also be used. The reactant may be applied to the entire surface of the intermediate transfer body or only to the area where an intermediate image (described below) is to be formed.

Formation of an Intermediate Image

An intermediate image is then formed through the application of ink to the intermediate transfer body carrying the reactant. The intermediate image herein refers to an image formed on the intermediate transfer body and waiting for it being finally transferred to the recording medium. The intermediate image, yet to be transferred, is a mirror image of the finished image.

Ink

An ink according to an embodiment of the invention may contain, for example, a coloring material, polymer particles, a surfactant, a solvent, and additives. When the coloring material is a pigment, the ink may contain a pigment dispersant.

Coloring Material

Examples of coloring materials that can be used include dyes as well as pigments such as carbon black and organic pigments. These may be used alone or in a combination of two or more. The use of a pigment will ensure good durability and quality of records.

Pigment

The pigment can be of any kind. Inorganic and organic pigments can be used, including those identified with C.I. (color index) numbers. An example of a black pigment that can be used is carbon black. When the coloring material is a pigment, the pigment content of the ink can be 0.5% by mass or more and 15.0% by mass or less, preferably 1.0% by mass or more and 10.0% by mass or less, of the total mass of the ink.

Pigment Dispersant

The pigment dispersant, which is a dispersant that helps pigment to disperse, can be of any kind. An example is a water-soluble pigment dispersant the structure of which contains both hydrophilic and hydrophobic moieties. Such a dispersant may be a copolymer of at least a hydrophilic monomer and a hydrophobic monomer. The hydrophobic monomer can be of any kind. Examples include styrene, styrene derivatives, alkyl (meth)acrylates, and benzyl (meth)acrylate. The hydrophilic monomer can also be of any kind. Examples include acrylic acid, methacrylic acid, and maleic acid. These may be used alone or in a combination of two or more.

The acid value of the pigment dispersant can be 50 mg KOH/g or more and 550 mg KOH/g or less. The weight-average molecular weight of the pigment dispersant can be 1000 or more and 50000 or less. The acid value is a measurement obtained using AT-610 automatic potentiometric titrator (a trade name of Kyoto Electronics Manufacturing). The weight-average molecular weight is a measurement obtained using the sedimentation velocity method. The ratio of the pigment to the pigment dispersant (by mass; pigment:dispersant) can be in the range of 1:0.1 to 1:3. Note that the use of a pigment dispersant is optional. A self-dispersion pigment, which is a pigment that has been made dispersible through surface modification, can be used instead.

Polymer Particles

Adding polymer particles to the ink can improve the quality and fixation of images. The material from which the polymer particles are made can be of any kind. Examples include homopolymers such as polyolefins, polystyrene, polyurethane, polyester, polyethers, polyurea, polyamides, polyvinyl alcohol, poly(meth)acrylic acid and poly(meth)acrylic acid salts, alkyl poly(meth)acrylates, and polydienes and copolymers as combinations of two or more of them. These materials may be used alone or in a combination of two or more. The weight-average molecular weight of the polymer in the polymer particles can be 1,000 or more and 2,000,000 or less. The quantity of the polymer particles in the ink can be 1% by mass or more and 50% by mass or less, preferably 2% by mass or more and 40% by mass or less, of the total mass of the ink.

The polymer particles in the ink may be in the form of dispersion, i.e., polymer particles dispersed in a liquid. The dispersion can be of any type. An example is a dispersion of self-dispersion polymer particles obtained through the dispersion of a homopolymer of a monomer having a dissociative group or a copolymer of two or more of such monomers. Examples of dissociative groups include carboxyl, sulfonic acid, and phosphoric acid groups. Examples of monomers having a dissociative group include acrylic acid and methacrylic acid. These may be used alone or in a combination of two or more. The dispersion can also be an emulsion obtained through the dispersion of polymer particles using an emulsifier. The emulsifier can be a nonionic surfactant or a surfactant having the same polarity of charge as the polymer particles. The dispersion particle diameter of the dispersion of polymer particles can be 10 nm or more and 1000 nm or less, preferably 100 nm or more and 500 nm or less. The dispersion of polymer particles may contain stabilizing additives. Examples of such additives include n-hexadecane, dodecyl methacrylate, stearyl methacrylate, chlorobenzene, dodecyl mercaptan, olive oil, bluing agents (Blue 70), and polymethyl methacrylate. These may be used alone or in a combination of two or more.

Surfactant

The ink may contain compound (1) as a surfactant. Note that in a method according to an embodiment of the invention, at least one of the reactant, the ink, and the auxiliary liquid contains compound (1). When the ink contains compound (1), the quantity of compound (1) in the ink can be 0.01% by mass or more and 10% by mass or less, preferably 1% by mass or more and 5% by mass or less, of the total mass of the ink.

The ink may contain a surfactant different from compound (1) (non-compound (1) surfactant). Examples of commercially available non-compound (1) surfactants include Acetylenol EH (a trade name of Kawaken Fine Chemicals). These may be used alone or in a combination of two or more. The quantity of this surfactant in the ink can be 0.01% by mass or more and 10% by mass or less, preferably 0.01% by mass or more and 5% by mass or less, of the total mass of the ink.

Solvent

The ink may contain a solvent that is water and/or a water-soluble organic solvent. The water can be ion-exchanged or any other deionized water. When the ink contains water, the water content of the ink can be 30% by mass or more and 97% by mass or less of the total mass of the ink. The water-soluble organic solvent can be of any kind, such as glycerin, diethylene glycol, polyethylene glycol, and 2-pyrrolidone. These may be used alone or in a combination of two or more. When the ink contains a water-soluble organic solvent, the water-soluble organic solvent content of the ink can be 3% by mass or more and 70% by mass or less of the total mass of the ink.

Additives

Besides the components described above, the ink may optionally contain additives. Examples include pH adjusters, antirusts, preservatives, antimolds, antioxidants, reduction inhibitors, water-soluble polymers and neutralizing agents for them, and viscosity modifiers. These may be used alone or in a combination of two or more.

Application of the Ink

The ink can be applied using an inkjet device. Inkjet devices can be in various forms, such as one that ejects ink by forming air bubbles in the ink through film boiling initiated using an electrothermal transducer, one that uses an electromechanical transducer to eject ink, and one that uses static electricity to eject ink. Any of such forms of inkjet devices can be used in an embodiment of the invention. An inkjet device that uses an electrothermal transducer, however, allows rapid and high-density recording. The entire structure of the inkjet device is not critical. For example, it is possible to use an inkjet head called a shuttle head, which produces a record while moving in the direction perpendicular to the direction of the travel of the intermediate transfer body. It is also possible to use an inkjet head called a line head, which has ink ejection openings arranged in a line roughly perpendicular to the direction of the travel of the intermediate transfer body (i.e., roughly parallel to the axial direction for a drum-shaped intermediate transfer body).

The ink is applied in such a manner that it at least partially overlaps with the reactant on the intermediate transfer body. This produces an intermediate image on the intermediate transfer body. It is also possible to apply the ink to make it completely overlap with the reactant on the intermediate transfer body.

Application of an Auxiliary Liquid

An auxiliary liquid is then applied to the intermediate image to form an intermediate image layer. The auxiliary liquid contains a water-soluble polymer.

Auxiliary Liquid

The auxiliary liquid can contain, for example, a water-soluble polymer, a surfactant, and a solvent.

Water-Soluble Polymer

The water-soluble polymer can be of any kind. It may be that a water-soluble polymer is chosen as being suitable for the method used to apply the auxiliary liquid. For example, if an aforementioned inkjet device is used to apply the auxiliary liquid, it is possible to use a water-soluble polymer having a weight-average molecular weight of 2000 or more and 10000 or less, preferably 5000 or more and 10000 or less. If a roller-based applicator is used to apply the auxiliary liquid, a water-soluble polymer with a larger weight-average molecular weight can be used.

Examples of water-soluble polymers that can be used include block, random, and graft copolymers of at least two monomers (including at least one hydrophilic polymerizable monomer) selected from styrene, styrene derivatives, vinyl-naphthalene, vinylnaphthalene derivatives, α,β-ethylenically unsaturated carboxylic acid-aliphatic alcohol esters, acrylic acid, acrylic acid derivatives, malic acid, maleic acid derivatives, itaconic acid, itaconic acid derivatives, fumaric acid, fumaric acid derivatives, vinyl acetate, vinyl alcohol, vinyl pyrrolidone, and acrylamide as well as salts of these copolymers. Natural polymers such as rosin, shellac, and starch can also be used. These polymers are alkali-soluble polymers, i.e., polymers soluble in aqueous solutions of bases. These water-soluble polymers may be used alone or in a combination of two or more. The glass transition temperature of the water-soluble polymer can be 40° C. or more and 120° C. or less. The glass transition temperature of the water-soluble polymer is a measurement obtained using a differential scanning calorimeter (Mettler-Toledo). The water-soluble polymer content of the auxiliary liquid can be in the range of 0.1% to 20% by mass, preferably 0.1% to 10% by mass, of the total mass of the auxiliary liquid.

Surfactant

The auxiliary liquid may contain compound (1) as a surfactant. Note that in a method according to an embodiment of the invention, at least one of the reactant, the ink, and the auxiliary liquid contains compound (1). When the auxiliary liquid contains compound (1), the quantity of compound (1) in the auxiliary liquid can be 0.01% by mass or more and 10% by mass or less, preferably 1% by mass or more and 5% by mass or less, of the total mass of the auxiliary liquid.

The auxiliary liquid may contain a surfactant different from compound (1) (non-compound (1) surfactant). Examples of commercially available non-compound (1) surfactants include Acetylenol EH (a trade name of Kawaken Fine Chemicals). These may be used alone or in a combination of two or more. The quantity of this surfactant in the auxiliary liquid can be 0.01% by mass or more and 10% by mass or less, preferably 0.01% by mass or more and 5% by mass or less, of the total mass of the auxiliary liquid.

Solvent

The auxiliary liquid may contain a solvent that is an appropriate amount of water or organic solvent. The water can be ion-exchanged or any other deionized water. The organic solvent can be of any kind.

Application of the Auxiliary Liquid

Any method can be used to apply the auxiliary liquid. An example is a method in which an aforementioned inkjet device is used to apply the auxiliary liquid. The auxiliary liquid is applied in such a manner that it at least partially overlaps with the intermediate image. This produces an intermediate image layer on the intermediate transfer body. It is also possible to apply the auxiliary liquid to make it completely overlap with the intermediate image. During this process, intermolecular interactions occur between compound (1) and the water-soluble polymer in the intermediate image layer. The intermolecular interactions lead to an aggregate being formed in the intermediate image layer through the mediation of the water-soluble polymer, increasing the viscosity of the intermediate image layer.

Drying

A method according to an embodiment of the invention may include drying the intermediate image layer between the application of the auxiliary liquid and the transfer of the intermediate image layer (described hereinafter). This is because excessive liquid in the intermediate image layer can cause defects in the finished image or incomplete transfer of the image as a result of the surplus liquid being squeezed or spilled out during the transfer of the intermediate image layer. Examples of drying methods that can be used include heating, blowing of low-humidity air or similar, pressure reduction, and combinations of these. Air-drying is also allowed.

If heating is chosen, devices such as a halogen lamp can be used to heat the intermediate transfer image. The recording medium may be heated together with the intermediate image layer. Heating both of the intermediate image layer and the recording medium leads to controlling the temperature of the intermediate image layer and the recording medium during the transfer of the intermediate image layer. It may also be that the intermediate image layer is additionally heated during the application of the auxiliary liquid or the transfer of the intermediate image layer. In such a case, the heating temperature does not have to be constant.

Image Transfer

The intermediate image layer is then transferred to a recording medium. The intermediate image layer can be transferred to the recording medium through the pressing of the intermediate transfer body and the recording medium against each other. The method for pressing the intermediate transfer body and the recording medium against each other is not critical. However, pressing the recording medium between a pressure roller and the intermediate transfer body carrying the intermediate image layer will ensure efficient transfer of the intermediate image. Pressing the recording medium in multiple steps can reduce the degree of incomplete transfer.

The pressure roller may contain a heater to control the transfer temperature. The heater may be located in part of or throughout the roller. As mentioned hereinafter, it is possible to choose any transfer temperature suitable for the selected water-soluble polymer. The heater may therefore be configured to heat the surface of the pressure roller to any temperature in the range of 25° C. to 140° C.

The recording medium can be of any kind. However, the use of wood-free paper (uncoated printing paper) or any other recording paper having low smoothness on its recording surface will make the advantages of certain aspects of the invention more effective.

It is possible that the temperature of the intermediate image layer at the time of contact with the recording medium is equal to or higher than the glass transition temperature of the water-soluble polymer and that at the time of release from the intermediate transfer body is lower than the glass transition temperature of the water-soluble polymer. Ensuring that the temperature of the intermediate image layer at the time of contact is equal to or higher than the glass transition temperature of the water-soluble polymer will improve the adhesion between the recording medium and the intermediate image layer by increasing the fluidity of the water-soluble polymer. Furthermore, ensuring that the temperature of the intermediate image layer at the time of release is lower than the glass transition temperature of the water-soluble polymer will prevent the interfacial separation of the intermediate image layer and the recording medium by keeping the water-soluble polymer in its glass phase. These improve the efficiency of the transfer of images to the recording medium. Note that the temperature of the intermediate image layer at the time of contact with the recording medium is the temperature of the intermediate image layer at the time when at least part of it comes into contact with the recording medium. The temperature of the intermediate image layer at the time of release from the intermediate transfer body is the temperature of the intermediate image layer (image) at the time when the intermediate image layer has been completely transferred to the recording medium.

The temperatures of the intermediate image layer are measurements obtained using an infrared radiation thermometer.

The difference between the temperature of the intermediate image layer at the time of contact with the recording medium and the glass transition temperature of the water-soluble polymer can be 0° C. or more and 35° C. or less, preferably 10° C. or more and 35° C. or less. The difference between the temperature of the intermediate image layer at the time of release from the intermediate transfer body and the glass transition temperature of the water-soluble polymer can be 1° C. or more and 60° C. or less.

The temperature of the intermediate image layer at the time of contact with the recording medium can be 50° C. or more and 140° C. or less. The temperature of the intermediate image layer at the time of release from the intermediate transfer body can be 25° C. or more and 70° C. or less.

Fixation

A method according to an embodiment of the invention may include fixing the image to the recording medium after the transfer of the intermediate image layer. For example, pressing the recording medium with a roller after the recording of the image will make the image more firmly fixed to the recording medium. Heating the recording medium will also enhance the fixation of the image. The use of a heating roller allows simultaneous heating and pressing of the recording medium.

Recording Apparatus

A recording apparatus according to an embodiment of the invention has a reactant applicator configured to apply a reactant to an intermediate transfer body, the reactant configured to thicken upon contact with ink, an intermediate image formation unit configured to form an intermediate image by applying ink to the intermediate transfer body carrying the reactant, an auxiliary liquid applicator configured to apply an auxiliary liquid to the intermediate image to form an intermediate image layer, the auxiliary liquid containing a water-soluble polymer and a transfer unit configured to transfer the intermediate image layer to a recording medium. At least one selected from the group consisting of the reactant, the ink, and the auxiliary liquid contains a compound represented by formula (1) (compound (1)). The reactant applicator may be provided with the reactant. The intermediate image formation unit may be provided with the ink. The auxiliary liquid applicator may be provided with the auxiliary liquid. A recording apparatus according to an embodiment of the invention allows suitable implementation of a recording method according to an embodiment of the invention. The following describes an example of a recording apparatus according to an embodiment of the invention with reference to the FIGURE. Note that the recording apparatus illustrated in the FIGURE is not the only possible structure of a recording apparatus according to an embodiment of the invention.

The FIGURE illustrates a transfer inkjet recording apparatus as an example of a recording apparatus according to an embodiment of the invention. The intermediate transfer body 101 is a substrate that carries the reactant, the ink, and the auxiliary liquid and on which the intermediate image is formed. The intermediate transfer body 101 in the FIGURE has a supporting member 102 and a surface member 104 on the supporting member 102. The supporting member 102 is used to handle the intermediate transfer body 101 and transmit required force to it. The surface member 104 is used to form the intermediate image. The intermediate transfer body 101 contains a heater 112.

Examples of shapes of the intermediate transfer body 101 include a sheet, a roller, a drum, a belt, and an endless web.

The use of an intermediate transfer body in the shape of a drum, a belt, or an endless web improves productivity because it allows continuous and repeated use of the same intermediate transfer body. The intermediate transfer body 101 in the FIGURE is in the shape of a drum. The intermediate transfer body 101 may be any size suitable for the intended size of images.

The supporting member 102 may have a degree of structural strength for accurate conveyance and durability. Examples of materials of which the supporting member 102 can be made include metals, ceramics, and resins. The following materials provide rigidity high enough to withstand the pressure during image transfer and sufficient dimensional accuracy while improving response to handling by reducing operational inertia: aluminum, iron, stainless steel, acetal resins, epoxy resins, polyimides, polyethylene, polyethylene terephthalate, nylon, polyurethane, silica ceramics, and alumina ceramics. These materials may be used alone or in a combination of two or more.

The surface member 104 may have a degree of elasticity so that the intermediate image can be transferred to the recording medium, such as paper, through the pressing of the intermediate image. When the recording medium is paper, the hardness of the surface member 104 can be in the range of 10° to 100°, preferably 20° to 60°, as measured using a type-A durometer (JIS K6253-compliant).

The surface member 104 may be made of any suitable material, such as polymers, ceramics, and metals. Rubber materials and elastomeric materials are moderately elastic and highly workable. Specific examples of materials of which the surface member 104 can be made include polybutadiene rubbers, nitrile rubbers, chloroprene rubbers, silicone rubbers, fluorinated rubbers, urethane rubbers, styrene elastomers, olefin elastomers, vinyl chloride elastomers, ester elastomers, and amide elastomers. The surface member 104 can also be made of materials such as polyethers, polystyrene, polycarbonate, siloxane compounds, and perfluorocarbon compounds. Nitrile-butadiene rubbers, silicone rubbers, fluorinated rubbers, and urethane rubbers have some good characteristics such as dimensional stability, durability, and heat resistance. These materials may be used alone or in a combination of two or more.

The surface member 104 may be a stack of multiple materials. For example, the surface member 104 can be an endless belt of urethane rubber coated with silicone rubber, a sheet composed of a PET film and a layer of silicone rubber on it, or a sheet of urethane rubber carrying a film of a polysiloxane compound. It is also possible to use a sheet composed of a piece of fabric (e.g., cotton, polyester, or rayon) as a substrate and a rubber material (e.g., nitrile-butadiene or urethane rubber) as an impregnant.

The surface member 104 may be surface-treated. Examples of appropriate surface treatments include exposure to flame, corona, or plasma, polishing, coarsening, irradiation with active radiation (e.g., UV, IR, or RF), treatment with a surfactant, and silane coupling. These surface treatments may be performed in combination. There may be a holding material between the surface member 104 and the supporting member 102, such as adhesive material or double-sided tape.

The intermediate transfer body 101 is driven to rotate around an axis 106 in the direction of the arrow, and the surrounding devices operate synchronously with the rotation of the intermediate transfer body 101. The structure in the FIGURE includes a roller-based applicator 105 (the reactant applicator), which continuously applies a reactant to the surface of the intermediate transfer body 101. The structure also includes an inkjet device 103 (the intermediate image formation unit) located downstream of the roller-based applicator 105. The inkjet device 103 ejects ink for the formation of intermediate images, thereby forming an intermediate image on the intermediate transfer body 101 carrying the reactant. Another inkjet device 107 (the auxiliary liquid applicator) is located downstream of the inkjet device 103. The inkjet device 107 for ejecting auxiliary liquid ejects an auxiliary liquid onto the intermediate image, thereby forming an intermediate image layer on the intermediate transfer body 101. An air blower 110 to reduce the liquid content of the ink making up the intermediate image is present downstream of the inkjet device 107. The air blower 110 reduces the liquid content of the ink making up the intermediate image, thereby reducing the occurrence of defects in the image during image transfer. An image transfer section 131 located downstream of the air blower 110 includes a pressure roller 113 (the transfer unit). Transport rollers 114 and transport guides 109 transport a recording medium 108, and the pressure roller 113 transfers the intermediate image by bringing this recording medium 108 into contact with the intermediate image layer formed on the intermediate transfer body 101. Pressing the intermediate image layer and the recording medium 108 together between the intermediate transfer body 101 and the pressure roller 113 leads to efficient transfer of the intermediate image layer to the recording medium 108. In this way, an image is recorded on the recording medium 108.

EXAMPLES

The following describes some specific embodiments of the invention with reference to the drawing. No aspect of the invention is limited to these examples while within the scope of the invention. The terms "parts" and "%" in the following text are based on mass unless otherwise specified.

Example 1

Preparation of Reactant

A mixture of 30 parts of glutaric acid, 7 parts of glycerin, 5 parts of a surfactant (trade name, Acetylenol EH; Kawaken Fine Chemicals; cloud point, 63° C.), and 58 parts of ion-exchanged water was thoroughly stirred. The stirred mixture was filtered under pressure through a Micro Filter (Fujifilm) with a pore size of 3.0 μm, yielding the reactant. The above cloud point of the surfactant is a measurement obtained through the heating of a 1% by mass aqueous solution of the surfactant.

Preparation of Ink

Preparation of Black Pigment Dispersion

A mixture of 10 parts of carbon black (product name, Monarch 1100; Cabot), 15 parts of an aqueous solution of a pigment dispersant (a styrene-ethyl acrylate-acrylic acid copolymer (acid value, 150; weight-average molecular weight, 8,000), 20% solids by mass, neutralized with potassium hydroxide), and 75 parts of purified water was loaded into a batch vertical sand mill (AIMEX Co., Ltd.). The mixture was then dispersed for 5 hours with 200 parts of 0.3-mm zirconia beads while being cooled with water. Coarse particles in the resulting dispersion were then removed through centrifugation, yielding black pigment dispersion with a pigment concentration of 10% by mass.

Preparation of a Dispersion of Polymer Particles

A mixture of 18 parts of butyl methacrylate, 2 parts of 2,2'-azobis-(2-methylbutyronitrile), and 2 parts of n-hexadecane was stirred for 0.5 hours. The stirred mixture was added dropwise to 78 parts of a 6% by mass aqueous solution of an emulsifier (trade name, NIKKOL BC15; Nikko Chemicals), followed by 0.5 hours of stirring. The stirred liquid was sonicated with an ultrasonic device for 3 hours. After 4 hours of polymerization in a nitrogen atmosphere at 80° C., the liquid was allowed to cool to room temperature and then filtered. In this way, a dispersion of polymer particles was obtained with a concentration of 20% by mass.

A mixture of 5 parts of the black pigment dispersion, 30 parts of the dispersion of polymer particles, 5 parts of glycerin, 4 parts of diethylene glycol, 1 part of a surfactant (trade name, Acetylenol EH; Kawaken Fine Chemicals), and 55 parts of ion-exchanged water was thoroughly stirred. The stirred mixture was filtered under pressure through a Micro Filter (Fujifilm) with a pore size of 3.0 μm, yielding the ink. The reactant thickens when coming into contact with this ink.

Preparation of Auxiliary Liquid

A mixture of 30 parts of the dispersion of polymer particles, 3 parts of an aqueous solution of a water-soluble polymer (a styrene-butyl acrylate-acrylic acid copolymer (acid value, 132; weight-average molecular weight, 7,700; glass transition temperature, 78° C.), 20% solids by mass, neutralized with potassium hydroxide), 5 parts of glycerin, 4 parts of diethylene glycol, 1 part of a surfactant (trade name, Adeka Pluronic L31; ADEKA Corporation), and 57 parts of ion-exchanged water was thoroughly stirred. The stirred mixture was filtered under pressure through a Micro Filter (Fujifilm) with a pore size of 3.0 μm, yielding the auxiliary liquid. The glass transition temperature of the water-soluble polymer is a measurement obtained using a differential scanning calorimeter (Mettler-Toledo).

Recording of an Image

In this Example, a recording apparatus having the structure in the FIGURE and the method described above were used to record an image. The supporting member 102 of the intermediate transfer body was a cylindrical drum made of an aluminum alloy because aluminum provides rigidity high enough to withstand the pressure during image transfer and sufficient dimensional accuracy while improving response to handling by reducing rotational inertia. The surface member 104 of the intermediate transfer body was the following material. A 0.5-mm thick PET sheet was coated with a 0.2-mm thick layer of a silicone rubber having a rubber hardness of 40° (trade name, KE12; Shin-Etsu Chemical). The coated surface was plasma-treated using an atmospheric plasma treatment system (trade name, ST-7000; Keyence) under the following conditions: processing distance, 5 mm; mode of plasma, High; processing speed, 100 mm/sec. The surface was then immersed for 10 seconds in an aqueous solution of a surfactant, more specifically a commercially available neutral detergent containing sodium alkylbenzene sulfonate diluted with purified water to 3% by mass. After washing in water and drying, the resulting surface member 104 was fastened to the supporting member 102 with double-adhesive tape.

The inkjet device 103 was a combination of a device configured to eject ink on demand using an electrothermal transducer and a line head having ejection openings arranged in a line roughly parallel to the axis 106 of the intermediate transfer body 101. The recording medium 108 was OK Prince Wood-Free paper (a trade name of Oji Paper, 127.9 g/m²).

In the image transfer section 131, the temperature of the intermediate image layer at the time of contact with the recording medium 108 was set to be 50° C. The temperature of the intermediate image layer at the time of release from the intermediate transfer body 101 was set to be 30° C. These temperatures of the intermediate image layer are measurements obtained using an infrared radiation thermometer. The temperature of the recording medium 108 was set to be 25° C.

Evaluation of Percentage Transfer to Recording Medium

The percentage transfer of the ink from the intermediate transfer body 101 to the recording medium 108 was evaluated through calculations from the ratio of the area of the intermediate image before transfer to that of the intermediate image left on the intermediate transfer body after transfer. Table 1 presents the result.

Example 2

The surfactant in the reactant was Adeka Pluronic L31 (a trade name of ADEKA) instead of Acetylenol EH (a trade name of Kawaken Fine Chemicals). The surfactant in the auxiliary liquid was Acetylenol EH (a trade name of Kawaken Fine Chemicals) instead of Adeka Pluronic L31 (a trade name of ADEKA). Except for these, the same procedure as in Example 1 was followed to record an image and evaluate percentage transfer. Table 1 presents the result.

Example 3

The surfactant in the ink was Adeka Pluronic L31 (a trade name of ADEKA) instead of Acetylenol EH (a trade name of Kawaken Fine Chemicals). The surfactant in the auxiliary liquid was Acetylenol EH (a trade name of Kawaken Fine Chemicals) instead of Adeka Pluronic L31 (a trade name of ADEKA). Except for these, the same procedure as in Example 1 was followed to record an image and evaluate percentage transfer. Table 1 presents the result.

Example 4

The recording of an image and subsequent evaluation of percentage transfer was conducted in the same way as in Example 1, except that the surfactant in the ink was Adeka Pluronic L31 (a trade name of ADEKA) instead of Acetylenol EH (a trade name of Kawaken Fine Chemicals). Table 1 presents the result.

Example 5

The recording of an image and subsequent evaluation of percentage transfer was conducted in the same way as in Example 1, except that the surfactant in the reactant was Adeka Pluronic L31 (a trade name of ADEKA) instead of Acetylenol EH (a trade name of Kawaken Fine Chemicals). Table 1 presents the result.

Example 6

The surfactant in the reactant and the ink was Adeka Pluronic L31 (a trade name of ADEKA) instead of Acetylenol EH (a trade name of Kawaken Fine Chemicals). The surfactant in the auxiliary liquid was Acetylenol EH (a trade name of Kawaken Fine Chemicals) instead of Adeka Pluronic L31 (a trade name of ADEKA). Except for these, the same procedure as in Example 1 was followed to record an image and evaluate percentage transfer. Table 1 presents the result.

Example 7

The recording of an image and subsequent evaluation of percentage transfer was conducted in the same way as in Example 1, except that the surfactant in the reactant and the ink was Adeka Pluronic L31 (a trade name of ADEKA) instead of Acetylenol EH (a trade name of Kawaken Fine Chemicals). Table 1 presents the result.

Example 8

The recording of an image and subsequent evaluation of percentage transfer was conducted in the same way as in Example 2, except that the surfactant in the reactant was Adeka Pluronic L34 (a trade name of ADEKA) instead of Adeka Pluronic L31 (a trade name of ADEKA). Table 1 presents the result.

Comparative Example 1

The recording of an image and subsequent evaluation of percentage transfer was conducted in the same way as in Example 1, except that the surfactant in the auxiliary liquid was Acetylenol EH (a trade name of Kawaken Fine Chemicals) instead of Adeka Pluronic L31 (a trade name of ADEKA). Table 1 presents the result.

Comparative Example 2

The recording of an image and subsequent evaluation of percentage transfer was conducted in the same way as in Example 1, except that the auxiliary liquid was prepared without the aqueous solution of a water-soluble polymer. Table 1 presents the result.

TABLE 1

| | | Example 1 | Example 2 | Example 3 |
|---|---|---|---|---|
| Auxiliary liquid contains water-soluble polymer | | Yes | Yes | Yes |
| Glass transition temperature of water-soluble polymer (° C.) | | 78 | 78 | 78 |
| Surfactants | Reactant | Acetylenol EH | L31 | Acetylenol EH |
| | Ink | Acetylenol EH | Acetylenol EH | L31 |
| | Auxiliary liquid | L31 | Acetylenol EH | Acetylenol EH |
| Temperature of intermediate image layer at contact with recording medium (° C.) | | 50 | 50 | 50 |
| Temperature of intermediate image layer at release from intermediate transfer body (° C.) | | 30 | 30 | 30 |
| Percentage transfer to recording medium (%) | | 87 | 85 | 86 |

| | | Example 4 | Example 5 | Example 6 |
|---|---|---|---|---|
| Auxiliary liquid contains water-soluble polymer | | Yes | Yes | Yes |
| Glass transition temperature of water-soluble polymer (° C.) | | 78 | 78 | 78 |
| Surfactants | Reactant | Acetylenol EH | L31 | L31 |
| | Ink | L31 | Acetylenol EH | L31 |
| | Auxiliary liquid | L31 | L31 | Acetylenol EH |
| Temperature of intermediate image layer at contact with recording medium (° C.) | | 50 | 50 | 50 |
| Temperature of intermediate image layer at release from intermediate transfer body (° C.) | | 30 | 30 | 30 |
| Percentage transfer to recording medium (%) | | 92 | 92 | 89 |

TABLE 1-continued

| | | Example 7 | Example 8 | Comparative Example 1 |
|---|---|---|---|---|
| Auxiliary liquid contains water-soluble polymer | | Yes | Yes | Yes |
| Glass transition temperature of water-soluble polymer (° C.) | | 78 | 78 | 78 |
| Surfactants | Reactant | L31 | L34 | Acetylenol EH |
| | Ink | L31 | Acetylenol EH | Acetylenol EH |
| | Auxiliary liquid | L31 | Acetylenol EH | Acetylenol EH |
| Temperature of intermediate image layer at contact with recording medium (° C.) | | 50 | 50 | 50 |
| Temperature of intermediate image layer at release from intermediate transfer body (° C.) | | 30 | 30 | 30 |
| Percentage transfer to recording medium (%) | | 93 | 92 | 30 |

| | | Comparative Example 2 |
|---|---|---|
| Auxiliary liquid contains water-soluble polymer | | No |
| Glass transition temperature of water-soluble polymer (° C.) | | — |
| Surfactants | Reactant | Acetylenol EH |
| | Ink | Acetylenol EH |
| | Auxiliary liquid | L31 |
| Temperature of intermediate image layer at contact with recording medium (° C.) | | 50 |
| Temperature of intermediate image layer at release from intermediate transfer body (° C.) | | 30 |
| Percentage transfer to recording medium (%) | | 10 |

In Examples 1 to 8, at least one of the reactant, the ink, and the auxiliary liquid contained compound (1), and the auxiliary liquid contained a water-soluble polymer. Intermolecular interactions between these two compounds increased the viscosity of the intermediate image layer, resulting in a high percentage transfer. In Comparative Example 1, in which none of the reactant, the ink, and the auxiliary liquid contained compound (1), no such intermolecular interactions occurred and the percentage transfer was low. In Comparative Example 2, in which the auxiliary liquid contained no water-soluble polymer, the auxiliary liquid had no thickening effects and the percentage transfer was low. These results indicate that the use of a compound represented by formula (1) and an auxiliary liquid that contains a water-soluble polymer increases the viscosity of the intermediate image layer and eventually leads to efficient transfer of the intermediate image to the recording medium.

Example 9

The auxiliary liquid was prepared using an aqueous solution of a different water-soluble polymer (a styrene-butyl methacrylate-acrylic acid copolymer (acid value, 87; weight-average molecular weight, 7,200; glass transition temperature, 80° C.), 20% solids by mass, neutralized with potassium hydroxide). The temperature of the intermediate image layer at the time of contact with the recording medium 108 was changed to 80° C., and that at the time of release from the intermediate transfer body 101 was changed to 35° C. Except for these, the same procedure as in Example 1 was followed to record an image and evaluate percentage transfer. Table 2 presents the result.

Example 10

The recording of an image and subsequent evaluation of percentage transfer was conducted in the same way as in Example 9, except that the temperature of the intermediate image layer at the time of contact with the recording medium 108 was changed to 50° C., and that at the time of release from the intermediate transfer body 101 was changed to 30° C. Table 2 presents the result.

Example 11

The recording of an image and subsequent evaluation of percentage transfer was conducted in the same way as in Example 9, except that the auxiliary liquid was prepared using an aqueous solution of a different water-soluble polymer (a benzyl methacrylate-butyl acrylate-acrylic acid copolymer (acid value, 86; weight-average molecular weight, 8,100; glass transition temperature, 30° C.), 20% solids by mass, neutralized with potassium hydroxide). Table 2 presents the result.

TABLE 2

|  |  | Example 9 | Example 10 | Example 11 |
|---|---|---|---|---|
| Auxiliary liquid contains water-soluble polymer |  | Yes | Yes | Yes |
| Glass transition temperature of water-soluble polymer (° C.) |  | 80 | 80 | 30 |
| Surfactants | Reactant | Acetylenol EH | Acetylenol EH | Acetylenol EH |
|  | Ink | Acetylenol EH | Acetylenol EH | Acetylenol EH |
|  | Auxiliary liquid | L31 | L31 | L31 |
| Temperature of intermediate image layer at contact with recording medium (° C.) |  | 80 | 50 | 80 |
| Temperature of intermediate image layer at release from intermediate transfer body (° C.) |  | 35 | 30 | 35 |
| Percentage transfer to recording medium (%) |  | 98 | 87 | 90 |

The percentage transfer in Example 9 was higher than those in Examples 10 and 11. In Example 9, the auxiliary liquid contained compound (1), the temperature of the intermediate image layer at the time of contact with the recording medium 108 was not lower than the glass transition temperature of the water-soluble polymer in the auxiliary liquid, and that at the time of release from the intermediate transfer body 101 was lower than the glass transition temperature of the water-soluble polymer. Ensuring that the temperature of the intermediate image layer at the time of contact is equal to or higher than the glass transition temperature of the water-soluble polymer improves the adhesion between the recording medium and the intermediate image layer by increasing the fluidity of the water-soluble polymer. Furthermore, ensuring that the temperature of the intermediate image layer at the time of release is lower than the glass transition temperature of the water-soluble polymer prevents the interfacial separation of the intermediate image layer and the recording medium by keeping the water-soluble polymer in its glass phase. These collectively improved the percentage transfer to the recording medium, thereby allowing for very successful recording.

In Example 10, the auxiliary liquid contained compound (1), but the temperature of the intermediate image layer at the time of contact with the recording medium 108 was lower than the glass transition temperature of the water-soluble polymer. In this case, the fluidity of the water-soluble polymer is not high enough to improve the adhesion between the intermediate image layer and the recording medium 108. The percentage transfer was therefore sufficiently high but lower than that in Example 9. In Example 11, the auxiliary liquid contained compound (1), but the temperature of the intermediate image layer at the time of release from the intermediate transfer body 101 was higher than the glass transition temperature of the water-soluble polymer. In this case, the intermediate image layer and the recording medium are likely to undergo interfacial separation because the water-soluble polymer is not kept in its glass phase. The percentage transfer was therefore sufficiently high but lower than that in Example 9.

As can be seen from these results, it is possible to enhance the interactions between the intermediate image layer and the recording medium on the intermediate transfer body 101 by ensuring: the temperature of the intermediate image layer at the time of contact with the recording medium 108 is equal to or higher than the glass transition temperature of the water-soluble polymer; and the temperature of the intermediate image layer at the time of release from the intermediate transfer body 101 is lower than the glass transition temperature of the water-soluble polymer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-216511, filed Oct. 23, 2014, which is hereby incorporated by reference herein in its entirety.

What is claimed is:
1. A recording method comprising:
applying a reactant to an intermediate transfer body, the reactant configured to thicken upon contact with ink;
forming an intermediate image by applying ink to the intermediate transfer body carrying the reactant;
applying an auxiliary liquid to the intermediate image to form an intermediate image layer, the auxiliary liquid containing a water-soluble polymer; and
transferring the intermediate image layer to a recording medium;
in this order, wherein
the auxiliary liquid contains a compound represented by formula (1):

where "w" and "x" each independently represent a divalent organic group, "a" and "b" each independently represent a hydrogen atom or a monovalent organic group, "n" and "l" are each independently 1 or more and 75 or less, and "n"+"l" is 2 or more and 150 or less, "m" is 1 or more and 60 or less, and "p" and "q" are each independently 0 or 1.

2. The recording method according to claim 1, wherein during the transfer of the intermediate image layer, a temperature of the intermediate image layer at the time of contact with the recording medium is equal to or higher than a glass transition temperature of the water-soluble polymer, and a temperature of the intermediate image layer at the time of release from the intermediate transfer body is lower than the glass transition temperature of the water-soluble polymer.

3. The recording method according to claim 1, wherein during the transfer of the intermediate image layer, a difference between the temperature of the intermediate image layer at the time of contact with the recording medium and the glass transition temperature of the water-soluble polymer is 0° C. or more and 35° C. or less.

4. The recording method according to claim 1, wherein a weight-average molecular weight of the water-soluble polymer is 2000 or more and 10000 or less.

5. The recording method according to claim 1, further comprising drying the intermediate image layer between the application of the auxiliary liquid and the transfer of the intermediate image layer.

6. A recording apparatus comprising:
a reactant applicator provided with a reactant and configured to apply the reactant to an intermediate transfer body, the reactant being configured to thicken upon contact with ink;
an intermediate image formation unit provided with an ink and configured to form an intermediate image by applying the ink to the intermediate transfer body carrying the reactant;
an auxiliary liquid applicator provided with an auxiliary liquid and configured to apply the auxiliary liquid to the intermediate image to form an intermediate image layer, the auxiliary liquid containing a water-soluble polymer; and
a transfer unit configured to transfer the intermediate image layer to a recording medium, wherein
the auxiliary liquid contains a compound represented by formula (1):

where "w" and "x" each independently represent a divalent organic group, "a" and "b" each independently represent a hydrogen atom or a monovalent organic group, "n" and "l" are each independently 1 or more and 75 or less, and "n"+"l" is 2 or more and 150 or less, "m" is 1 or more and 60 or less, and "p" and "q" are each independently 0 or 1.

7. The recording method according to claim 2, wherein the glass transition temperature of the water-soluble polymer is 40° C. or more and 120° C. or less.

* * * * *